United States Patent
He

(10) Patent No.: US 7,920,558 B2
(45) Date of Patent: Apr. 5, 2011

(54) METHOD OF OPERATING A NETWORK

(75) Inventor: Liwen He, Suffolk (GB)

(73) Assignee: British Telecommunications Public Limited Company, London (GB)

( * ) Notice: Subject to any disclaimer, the term of this patent is extended or adjusted under 35 U.S.C. 154(b) by 433 days.

(21) Appl. No.: 11/794,391

(22) PCT Filed: Dec. 8, 2005

(86) PCT No.: PCT/GB2005/004719
§ 371 (c)(1),
(2), (4) Date: Jun. 28, 2007

(87) PCT Pub. No.: WO2006/070172
PCT Pub. Date: Jul. 6, 2006

(65) Prior Publication Data
US 2007/0297405 A1 Dec. 27, 2007

(30) Foreign Application Priority Data
Dec. 31, 2004 (GB) .................................. 0428553.2

(51) Int. Cl.
*H04L 12/28* (2006.01)
(52) U.S. Cl. ............... 370/389; 370/395.1; 370/395.52; 455/41.2
(58) Field of Classification Search .................. None
See application file for complete search history.

(56) References Cited

U.S. PATENT DOCUMENTS

| | | | |
|---|---|---|---|
| 2002/0069278 A1* | 6/2002 | Forsl | 709/225 |
| 2004/0220882 A1* | 11/2004 | Suto et al. | 705/64 |
| 2005/0044478 A1 | 2/2005 | Ali et al. | |
| 2005/0191990 A1* | 9/2005 | Willey et al. | 455/411 |

FOREIGN PATENT DOCUMENTS

| EP | 1 283 630 A3 | 12/2003 |
|---|---|---|
| WO | WO 03/077498 A | 9/2003 |
| WO | WO 03/077498 A1 | 9/2003 |

OTHER PUBLICATIONS

Xiaoqi "A trust model based routing protocol for secure ad hoc networks" Aerospace Conference, 2004. Proceedings. IEEE, US, vol. 2, Mar. 6, 2004, pp. 1286-1295, XP010748077 ISBN: 0-780.3-8155-6.*

(Continued)

*Primary Examiner* — Chi H Pham
*Assistant Examiner* — Kouroush Mohebbi
(74) *Attorney, Agent, or Firm* — Nixon & Vanderhye P.C.

(57) ABSTRACT

A data network has a number of inter-connected router devices forward received packets of data towards a destination node in accordance with a routing table associated with each router. A trust value is assigned to one or more other router devices, or links between router devices, in the network. A route metric is calculated in respect of one or more paths for forwarding on received data packets for onward transmission towards a specified destination. A next hop destination is selected for onward transmission of each such received packet to be forwarded on the basis of the calculated route metric for each applicable path. Each route metric is calculated in dependence upon the trust value assigned to one or more of the router or routers within each such path.

9 Claims, 2 Drawing Sheets

OTHER PUBLICATIONS

Pirzada, Asad Amir,"Establishing Trust in Pure Ad-hoc Networks" 27TH Australasian Computer Science Conference, Jan. 18, 2004, pp. 47-54, XP002366737 Univ. of Otago, Dunedin, New Zealand.*

Zhaoyu Liu et al, "A dynamic trust model for mobile ad hoc networks" Distributed Computing Systems, 2004. Proceedings. FTDCS 2004. IOTH IEEE International Workshop on Future Trends of Suzhou, China May 26-28, 2004, Piscataway, NJ, USA,IEEE, May 26, 2004, pp. 80-85, XP010712148 ISBN: 0-7695-2118-5.*

International Search Report for PCT/GB2005/004719 mailed Feb. 20, 2006.

Xiaoqi et al., "A trust model based routing protocol for secure ad hoc networks", Aerospace Conference 2004 Proceedings, vol. 2, pp. 1286-1295 (2004).

Pirzada et al., "Establishing Trust in Pure Ad-hoc Networks", 27th Australian Computer Science Conference, pp. 47-54 (2004).

Zhaoyu et al., "A dynamic trust model for mobile ad-hoc networks", Distributed Computing Systems 2004 Proceedings, 10th IEEE International Workshop on Future Trends of Suzhou, China, pp. 80-85 (2004).

Yi et al., "A security-aware routing protocol for wireless ad hoc networks", Proceedings of the ACM Symposium on Mobile Ad Hoc Networking and Computing, pp. 1-7, (2001) retrieved from the internet: http://www-sal.cs.uiuc.edu/{rhk/pubs/SCI2002.pdf>.

Bahargava et al., "Trusted Routing and Intruder Identification in Mobile Ad Hoc Networks", Research Proposal for CERIAS 2002, (2002) retrieved from the internet: http://raidlab.cs.purdue.edu/grants/cerias02.pdf>.

Sergio et al., "Mitigating Routing Misbehaviour in Mobile Ad Hoc Networks", Proceeding of the Sixth Annual International Conference on Mobile Computing and Networking, pp. 255-265 (2000) retrieved from the internet: http://www/hpl.hp.com/personal/Kevin_Lai/projects/adhoc.mitigating.pdf>.

International Search Report mailed Feb. 20, 2006 in International Application No. PCT/GB2005/004719.

UK Search Report dated May 9, 2005 in Application No. GB0428553.2.

Li et al., "A Trust Model Based Routing Protocol for Secure Ad Hoc Networks," 2004 IEEE Aerospace Conference Proceedings, vol. 2, Mar. 6, 2004, pp. 1286-1295.

Pirzada et al., "Establishing Trust in Pure Ad-Hoc Networks," 27th Australasian Computer Science Conference, Jan. 18, 2004, pp. 47-54.

Liu et al., "A Dynamic Trust Model for Mobile Ad Hoc Networks," Proceedings of the 10th IEEE International Workshop on Future Trends of Distributed Computing Systems (FTDCS'04), May 2004, pp. 80-85.

Yi et al., "A Security-Aware Routing Protocol for Wireless Ad Hoc Networks," Proceedings of the ACM Symposium on Mobile Ad Hoc Networking and Computing (MOBIHOC 2001), 2001, pp. 1-7.

Bhargava et al., "Trusted Routing and Intruder Identification in Mobile Ad Hoc Networks," Research Proposal for CERIAS 2002, 2002, 12 pages.

Marti et al., "Mitigating Routing Misbehavior in Mobile Ad Hoc Networks," Proceedings of the Sixth Annual International Conference on Mobile Computing and Networking (MOBICOM 2000), 2000, pp. 255-265.

* cited by examiner

METHOD OF OPERATING A NETWORK

This application is the US national phase of international application PCT/GB2005/004719 filed 8 Dec. 2005 which designated the U.S. and claims benefit of GB 0428553.2, dated 31 Dec. 2004, the entire content of which is hereby incorporated by reference.

BACKGROUND

1. Technical Field

The present invention relates to a method of operating a network. In particular, the present invention relates to a method of operating a data network or internetwork (i.e. a collection of different networks linked together, the most well known example of which is the Internet), as well as to a network or internetwork operating in accordance with such a method and individual devices operable to carry out such a method within such a network.

2. Background

The Internet is a collection of different packet-switched networks linked together to form an internetwork. In order to successfully send data from one node on the Internet to another, a protocol referred to as the Internet Protocol (IP) is used. This enables an IP datagram to be routed through the Internet from a transmitting or originating source node to a receiving or terminating destination node. As will be well known to persons skilled in the art of data networks, IP is a layer 3 or network layer protocol when compared with the ISO seven layer reference model of data networks. This essentially means that it is responsible for carrying data over multiple hops across a network or internetwork. Thus at each hop the ultimate IP address is read and an onward route is selected unless the data happens to have arrived at the destination node in which case it is passed up the layer stack.

Thus, IP is a data-oriented protocol used by source, destination and intermediate nodes (which might, for example, be a web server, a web client and multiple routers respectively) for communicating data across a packet-switched network (or, more usually, an internetwork). Furthermore, IP has the property that no specific set-up process is required before a source node attempts to transmit data to a destination node, irrespective of whether the nodes have previously communicated with one another before and irrespective of the type of data to be transmitted.

In order to achieve this, IP specifies that data is transmitted in IP datagrams, each of which comprises a header portion and a payload portion. The data to be transmitted (or a portion of it) is carried in the payload portion of an IP datagram whilst the header contains information which enables intermediate routers to process the datagram as a whole in an appropriate manner to try to deliver it to the destination node.

As mentioned above, IP represents only one layer out of many provided by an internetwork in order to enable data to be successfully transmitted over the internetwork which, by comparison with the seven layer OSI Reference Model, corresponds approximately to level 3, the Network level. "Beneath" the network layer is both a data link layer and a physical layer, and therefore each IP datagram is likely to be encapsulated within one or more lower layer (i.e. the link layer) data packets for transmission from one node on a network to another on the same network. However, each node will "strip out" the IP datagram from the received packet(s) and pass this to an IP function within each intermediate node, as well as at the destination node. The IP function within each intermediate node then reads the IP header portion to determine if it is the destination node. If it is the destination node, it will pass the contents of the payload portion of the IP datagram to the next layer function identified in the header portion of the IP datagram (e.g. to a Transport Control Protocol (TCP) function or to a User Datagram Protocol (UDP) function), if not, it will try to forward on the IP datagram towards the destination node—the mechanics of this are described in greater detail below. Intermediate nodes which are connected to multiple different networks and which are therefore important interconnecting nodes having often many direct connections with other nodes are typically known as routers or gateways and usually perform data transfer as their sole or primary purpose.

Internetworks can generally be considered as hierarchical entities which can be viewed at different scales. At a high level scale one can consider so-called Autonomous Systems (AS's). These will generally be connected together to form an internetwork of AS's. Each AS will typically comprise a network itself or even an internetwork, itself being formed from a number of smaller networks or subnetworks. Routers which connect different AS's together are often referred to as Border Gateways. In order to route traffic over an internetwork formed from a plurality of AS's, each AS maintains a routing table setting out to which neighbouring AS traffic should be sent in order to reach any given IP destination address. In some internetworks, these routing tables may be maintained in an autonomous manner using one of the inter-domain routing protocols (a domain is an AS) known as Border Gateway Protocol (BGP) of which the most current version at the filing date of the present application is BGP version 4 (as defined in the Internet Engineering Task Force's (IETF's) Request For Comments (RFC) 1654). With BGP, Transport Control Protocol (TCP) connections are established between AS's in order to transfer routing information between border gateway routers.

Within an autonomous system, a similar mechanism is used to route IP datagrams through the network from one point to another in which the routers again maintain a routing table. However, instead of using BGP, an Interior Gateway Protocol (IGP) is used instead. There are a number of IGP's currently in use. One popular IGP for relatively small networks is Routing Information Protocol (RIP) which uses the User Datagram Protocol (UDP) to transmit routing information between co-operating routers instead of forming TCP connections. Using RIP, a gateway host (with a router) sends its entire routing table (which lists all the other hosts it knows about) to its closest neighbour host every 30 seconds. The neighbour host in turn passes the information on to its next neighbour and so on until all hosts within the network have the same knowledge of routing paths, a state known as network convergence. RIP uses a hop count as a way to determine network distance. (Other protocols use more sophisticated algorithms that may, for example, include timing as well.) There are a number of different incarnations of RIP. One current version of RIP (known as RIP 2) is specified in IETF's RFC 2453.

Another popular IGP is Open Shortest Path First (OSPF) protocol. This is similar to RIP except that it has less overhead because it only transmits messages when there has been a change in a router's routing table. Also, it transmits more information than is transmitted in RIP. It also permits groups of nodes to be formed into areas, the internal structures of which are hidden from nodes outside of the areas, which simplifies routing within large AS's.

However, with all of these protocols there are possibilities for problems to occur. In particular, if bad routing information is gets into the system (either because one or more routers are malfunctioning in some way and therefore sending out erroneous information, or simply behaving poorly but still sending out information indicating that they are not behaving poorly, or because they have been compromised (e.g. if they have been "hacked" by a malicious third party), or because a "hacker" succeeds in passing false routing information to routers ("spoofing") which they then act upon. Any of these problems can send the system into chaos, causing large numbers of lost or heavily delayed packets (e.g. by a hacked router informing all neighbouring routers that it represents the best next hop to all destinations and then simply throwing away any received packets rather than forwarding them on). Moreover, by analysing control and data traffic, confidential information carried in the traffic may be exposed via a hacked router to unauthorised third parties.

Most attempts to deal with security issues involving routers have concentrated on authenticating communications between routers so that so-called "man-in-the-middle" and similar types of attack are prevented (or at least rendered more difficult). However, such approaches involve a significant amount of overhead, both in terms of processing cycles (to perform encryption and decryption) and in terms of extra information being broadcast (digital signatures, hash functions, etc.). Furthermore, they are wholly ineffective against the risk of "hacked" legitimate routers. Furthermore, all of these approaches are rather superficial, in that they attempt to deal on an ad hoc basis with any resulting problem/symptom rather than seeking to address the fundamental underlying cause.

BRIEF SUMMARY

According to the present exemplary embodiment, there is provided a method of operating a data network, of the type in which a number of inter-connected router devices forward received packets of data towards a destination node in accordance with a routing table associated with each router, the method comprising: assigning a trust value to one or more other router devices in the network, calculating a route metric in respect of one or more paths for forwarding on received data packets for onward transmission towards a specified destination, and selecting a next hop destination for onward transmission of each such received packet to be forwarded on the basis of the calculated route metric for each applicable path, wherein the or each route metric is calculated in dependence upon the trust value assigned to one or more of the router or routers within each such path.

By taking into consideration trust issues, provided the level of trust reflects to some extent the reliability of the device in question, routes will tend to be taken which use reliable devices in preference to unreliable ones. Preferably the level of trust is based on a number of factors. Preferably some of these factors will be fairly static (e.g. based on the type of entity responsible for the device, e.g. a large industrialised country versus an unknown individual) whilst some will be fairly dynamic (e.g. the frequency with which packets sent to a device are dropped). Preferably the factors include a plurality of inherent trust factors and a plurality of observed trust factors.

In routing protocols where each router is only aware of the first hop destination (i.e. an adjacent router) of different possible routes to various destinations when deciding the optimum path for onward forwarding of incoming transit data packets (e.g. RIP), the trust may be based solely on the trust associated with the adjacent nodes themselves. However, there could be differing trust levels in respect of different destinations via a single router device (e.g. if device A has a neighbour B which offers to forward on data packets to devices L and M, device A may attach a large trust to the route to L via B but a low trust to the route to M via B).

Where the routing protocol is such that all of the router devices along different competing paths are known and this information is used when calculating the metric(s) which will decide the preferred next hop device for any given destination (e.g. OSPF and BGP), the metric calculation may take into account the level of trust associated with each of the router devices in each candidate route in order to identify the best route.

According to a second aspect of the present invention, there is provided a method of operating a router device, within a data network of the type in which a number of inter-connected router devices forward received packets of data towards a destination node in accordance with a routing table associated with each router device, the method comprising: assigning a trust value to one or more other router devices in the network, calculating a route metric in respect of one or more paths for forwarding on received data packets for onward transmission towards a specified destination, and selecting a next hop destination for onward transmission of each such received packet to be forwarded on the basis of the calculated route metric for each applicable route, wherein the or each route metric is calculated in dependence upon the trust value assigned to one or more of the router or routers within each such path.

According to a third aspect of the present invention, there is provided a router device for use in a data network, the router comprising: storage means for storing a routing table; a plurality of communication ports for transmitting data packets to and receiving data packets from interconnected nodes when the router is in use as part of an interconnected network or internetwork of nodes or networks; and a processor or group of processors for calculating a metric in respect of one or more routes for the onward forwarding of received data packets and for selecting a next hop, in respect of each received data packet for onward forwarding, on the basis of the metric calculated for each route leading towards the desired destination of the data packet; characterised in that the storage means additionally stores a trust value assigned to each of one or more other router devices within the network; and in that the processor or group of processors is additionally operable to take into account the trust value of one or more associated other router devices in calculating the or each metric.

Note that certain routing protocols enable a number of different metrics to be calculated in respect of each possible route and different metrics may then be used in different circumstances. For example, some types of data packet might have no interest in how long it takes to reach its destination, but are concerned that the route is reliable with a minimum amount of lost packets (e.g. email), whereas for others having a short path delay is critical and the loss of a few packets is quite tolerable (e.g. voice over IP).

According to a fourth aspect of the present invention, there is provided a network or internetwork comprising a plurality of routers according to the third aspect of the present invention.

According to a fifth aspect of the present invention, there is provided a computer program or suite of computer programs for carrying out the method of either the first or the second aspect of the present invention during execution of the program and/or a carrier medium carrying such a program or suite of programs.

BRIEF DESCRIPTION OF THE DRAWINGS

In order that the present invention may be better understood, embodiments thereof will now be described, by way of example only, with reference to the accompanying drawings in which.

DETAILED DESCRIPTION OF EXEMPLARY EMBODIMENTS

Figure 1:
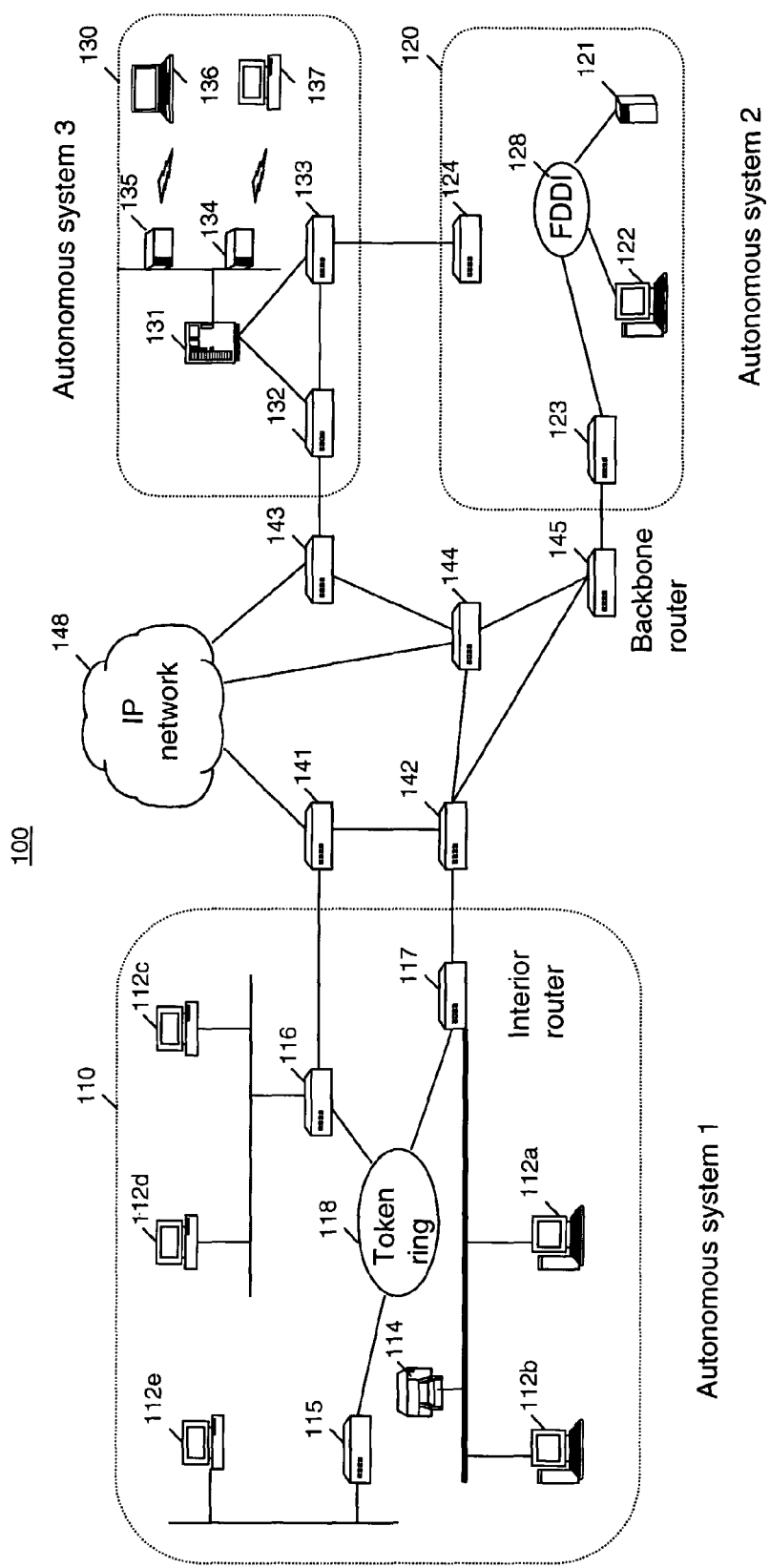
FIG. 1 is a schematic illustration of a data internetwork which is suitable for implementing an embodiment of the present invention.

Referring firstly to FIG. 1, the typical structure of a data internetwork as it relates to the present exemplary embodiment is discussed.

Structure of a Data Internetwork

FIG. 1 shows an internetwork 100 comprising a plurality of Autonomous Systems (AS's) 110, 120, 130 connected together via a backbone IP network 148 including a plurality of backbone routers 141-145. In this example, AS 110 comprises five workstations 112a-e connected together via a token ring Local Area Network (LAN) 118. AS 10 also includes a printer 114 and three interior routers 115, 116 and 117 all of which are also connected together by the token ring LAN 118. AS 12 comprises a workstation 122, a server 121 and two routers 123 and 124 all connected together via a Fibre Distributed Data Interface (FDDI) LAN 128. AS 130 comprises a server 131, two wired routers 132, 133 and two wireless routers 134, 135 which provide wireless connections to a laptop computer 136 and a desktop computer 137 respectively. It is not explicitly illustrated in FIG. 1 what type of LAN technology is used for linking together the components of AS 130 but it could, for example, be a simple Ethernet LAN.

In order to place the present invention in context, there will now be described in overview, the steps taken to transmit a packet of data from a first device 112a (hereinafter referred to as node 112a) on the internetwork 100 to a second device 136 (hereinafter referred to as node 136). When the IP function within node 112a receives a packet of data to be transmitted, it firstly checks whether the destination node is local to it (i.e. if it's for either of nodes 112b or 114). Since in this case the destination node (node 136) is not local to node 112a, it transmits the data packet to its local router 117. Router 117 examines the destination address and determines that it is outside AS 110 and thus determines that it needs to be sent to a gateway router having access to external networks. In the present case, router 117 is such a gateway router and thus it is able to forward the packet on to external router 142. External or backbone router 142 consults its router table to determine the currently preferred next hop for traffic to the network on which node 136 is located; for the purposes of the present example, we can assume that AS 3 is associated with its own unique network. Router 142 might therefore discover upon consulting its router table that router 144 is the currently preferred next hop destination, which in turn, may discover that router 143 is its currently preferred next hop destination for traffic to the network associated with AS 130. At router 143 it is determined that it has a direct link to gateway router 132 within AS 130 and the packet is therefore sent to router 132. Router 132 then consults its router table to look for node 136 (or more precisely, the IP address of node 136). Since node 136 in this case is a mobile device (a lap-top computer), it may well currently have a dynamically assigned temporary IP address assigned to it by wireless modem 135 which may have a limited number of IP addresses which it can dynamically assign to devices connecting to it and all of which will be known to the routers within AS 130 as being accessible from node 135; router 132 will therefore determine from its router table that device 131 is the next hop for traffic from router 132 heading towards node 135. At server 131 it again determines from its router table that the destination IP address is associated with node 135 and it therefore transmits the packet directly to wireless modem 135 which finally transmits the packet over the wireless link to laptop computer 136.

From the above discussion, it can be seen that in order to transmit data over an internetwork between two devices on separate networks, each packet is transmitted between a large number of nodes all of which act as routers (except for the origin and destination nodes) some of which are internal routers and some of which are back-bone routers with gateway routers straddling these two different domains. At each router, an internal routing table is consulted to determine the next hop for the packet. The sort of structure whereby internal routers have a detailed knowledge of the location of devices within its network and a single or only a very few default type options for dealing with traffic bound for external destinations and external routers have no knowledge of the internal structure of different networks belonging to autonomous systems but detailed knowledge of how to reach an ingress point to different networks connected to the back-bone network (which contains the external routers) is common. Such a structure is also scalable such that an internetwork such as that shown in FIG. 1 could actually form a subnetwork (or a sub-internetwork) of a larger collection of subnetworks (or sub-internetworks), linked together by an even fatter backbone network, etc.

The present invention relates to the way in which routers calculate the metrics which they then use in setting which paths (or at least the next hop) to use for (primarily) the onward routing of transiting data packets. In brief the procedure is to identify all possible routes (or at least all possible first hops) towards all known destinations (some of which may be lumped together in a default "all-other-destinations" grouping) and then to calculate a "metric" in respect of each candidate option (route or first hop) for each destination, and then to pick the best one (where there is a choice) for each destination on the basis of the calculated metric. This information is then used to populate (at least a part of) the routing table which is used by the router, when an incoming data packet, which is in transit, is received, to select the next hop for the data packet, and therefore the outgoing port of the router to which that data packet should be sent.

The present invention may be applied to all such methods. In particular, it is applicable to algorithms used for updating the routing tables of internal routers as well as to algorithms used for updating external routers. The following discussion therefore explains how the present invention may be applied to two typical routing algorithms used for routing data packets within an Autonomous System (AS) (namely the Routing Information Protocol (RIP) and the Open Shortest Path First (OSPF) protocol) and one typical routing algorithm used for routing data packets between external or gateway routers (and therefore between different AS's—i.e. inter-AS routing) (namely the Border Gateway Protocol (BGP)). Of course, as mentioned above, the present invention may be applied equally to other routing protocols in a corresponding manner to the manner in which it is illustrated below as being applied to RIP, OSPF and BGP.

Brief Overview of RIP, OSPF and BGP

Briefly, in RIP, packets are normally forwarded via the router recorded as having the lowest cost to that destination. The routing table only retains records corresponding to the lowest cost route for each destination (basically in the form of a list of destinations, the 'cost'—e.g. based on hop count—of reaching them and the first hop to use). Naturally, for actual routing decisions only a table of ultimate destination and corresponding first hop (and hence output port) is used, however the additional information of the "cost" is used to pass to other routers to help them decide which first hop to use.

In OSPF, instead of just associating a "cost" with each preferred route, each router generates a map (in an abstracted form) of the entire (internal) network and uses this to calculate the "shortest" path to each destination (and thus a mapping between ultimate destination and preferred next hop—with the additional sophistication that if a plurality of routes are found to be equally "short" then they are all included as options and traffic will be split over the multiple paths). This entire abstracted map is then transmitted to adjacent routers, periodically, to allow all routers to maintain an accurate network map.

In BGP which, unlike RIP and OSPF, is an exterior gateway protocol, rather than maintaining a map of the entire network, each router instead maintains a record of the entire preferred route to each destination which it knows about. The update messages which each router periodically transmits to other routers include the newest routing paths to all reachable destinations about which the router knows. BGP also facilitates the ranking of multiple alternative routes based on a set of pre-defined routing policies.

RIP in More Detail

In RIP, each router maintains a routing table indexed by, and containing one entry for, each router in the subnet. The entry contains two parts: the preferred outgoing link (i.e. the outgoing communications port), and therefore first hop, to use for that destination, and an estimate of the cost to that destination. The cost metric might be number of hops, time delay in milliseconds, total number of packets queued along the path or something similar. If delay is used as a metric, the router can measure it directly with special ECHO packets that the receiver just timestamps and sends back as fast as it can (note that this is a function specified by the Internet Engineering Task Force (IETF) in RFCs 792 and 1122 as belonging to the Internet Control Message Protocol (ICMP) and which must be provided by "every host" implementing IP).

As an example, assume that the router knows the delay to each of its neighbours. Once every T msec each router sends to each neighbour a list of its estimated delays to each router in the subnet (e.g. within an Autonomous System). It also receives a similar list from each of its neighbours. Imagine that one of these tables has just come in from neighbour X, with Xi being X's estimated of how long it takes to get to the node i. If this router knows that the delay to its neighbour X is m msec, it also knows that it can reach node i via X in (Xi+m) msec via X. By performing this calculation for each neighbour, a router can find out which estimate seems the best and use that estimate and the corresponding link in its new routing table.

OSPF in More Detail

In OSPF each router maintains an internal abstracted representation of the entire internal network (i.e. within the AS) (hereinafter called a "map") in the form of a directed graph (i.e. a number of "nodes" and a number of directed links or "arcs" connecting two nodes together with an associated "cost" or "distance" along the arc). In the graph internal networks such as small Local Area Networks (LANs) are represented as a node to which each host connected to the network has a pair of oppositely directed arcs connecting the host to the network node. Each arc directed from the network node to a connected host node is allocated a zero distance. From the internally maintained map, each router calculates its own Shortest Path First (SPF) tree of routes to all of its destinations contained in the map, with itself as the route. From this it determines a table mapping ultimate destinations to corresponding next hop for use in routing incoming data packets requiring onward forwarding.

In order to generate and maintain the map in each router, each router measures the "distance" to each of its neighbouring routers or "hosts" using "hello" messages and periodically sends and receives "Database Description" and "Link Update" messages to and from its "adjacent" router(s). For a full description of the operation of OSPF, the reader is referred to RFC1247.

BGP in More Detail

In BGP, pairs of BGP routers communicate with each other by establishing TCP connections. Operating this way provides reliable communication and hides all the details of the network being passed through. BGP is fundamentally a distance vector protocol, but quite different from RIP. Instead of maintaining just the cost to each destination, each BGP router keeps track of the exact path used. Similarly, instead of periodically giving each neighbour its estimated cost to each possible destination, each BGP router tells its neighbours the exact path it is using.

It will be noted from the above discussions that no detailed consideration has been give to the exact nature of the metric used in any of the above described routing protocols. In general all of the above described protocols are deliberately vague about the type of metric to be used for calculating "cost" or "distance" so that the administrator in charge of an AS or an External router may determine the best type of metric to be used. OSPF, in particular, permits different (unspecified) metrics to be associated with different Types Of Service (TOS). In RIP, generally a simple metric of number of hops is used as a metric of "cost" or "distance." In OSPF the routers will often use a sophisticated metric formed from a number of different components such as transit delay, length of queues, bandwidth, etc. In BGP in addition to using a sophisticated cost metric such as commonly used in OSPF, an administrator may use policies to prevent certain routes from being used at all, and certain routes may be assigned static costs by an administrator rather than allowing such costs to be dynamically altered according to conditions.

However, none of these provide a sophisticated adaptable trust model which enables a number of different aspects of overall trust to be combined and used in an efficient manner to enhance routing protocols.

In the sections below, three embodiments of the present invention are described. In essence, the embodiments are modifications of the RIP, OSPF and BGP protocols respectively, in which the metrics used for determining link "costs" or "distances" are modified according to a trust-value. The modified RIP, OSPF and BGP protocols, used as examples to illuminate the invention are referred to below as Trusted-RIP (T-RIP), Trusted-OSPF (T-OSPF) and Trusted-BGP (T-BGP). The same trust value may used in all three cases and an example form of Dynamic Distributed Trust Model (DDTM) which can be used for calculating an instantaneous trust value suitable for this purpose is described below.

Dynamic Distributed Trust Model

In the following embodiments, a general-purpose, protocol-independent Dynamic Distributed Trust Model (DDTM) which is suitable for any Internet routing protocol and associated infrastructure is described. This DDTM explicitly models inherent and observed, static and dynamic trust attributes of routers and captures the changing trust relationships between neighbouring routers as the routing system operates and evolves over time.

Trust in IP Routing Infrastructure:

Trust is an assessment that an entity can be counted on to perform according to a given set of standards in some domain.

A trust decision implies a judgement about the risk and vulnerability indicated by certain action, and thus a decision to carry out the action or not. More specifically, in Internet routing infrastructure, trust of one router A is evaluated by its neighbour router, for example, B, which may help B decide whether to route traffic to or via A or not. The higher level the trust, the more likely it is for B to prefer A, other factors being equal.

"Trust Tree" Concept:

The trust tree $T_t$ includes two major trunks, i.e. two main trust attributes: inherent trust $I_t$ and observed trust $O_t$. Each trunk comprises a number of elements ($I_p$-$I_h$ and $O_c$-$O_d$ described below). In this embodiment the elements ($I_p$-$I_h$ and $O_c$-$O_d$) forming the two main attributes are leaf elements, however, in alternative embodiments some or all of these elements could comprise one or more further levels of sub-elements, etc.

Inherent Trust, $I_t$:

Inherent trust of a network entity is the aspect of trust viewed by its neighbour based on the information from the owner organisation, which can be regarded as the honest intent and willingness to co-operate with other organisations based on an agreed standard. More specifically, trust of a router by its neighbour is evaluated based on political, financial, technical, historical, and operational information (each of which aspects is modelled with a corresponding element $I_p$, $I_f$, $I_{te}$, $I_h$, $I_o$) all of which are expected to vary with time only relatively slowly.

Observed Trust, $O_t$:

Observed trust of a network entity is viewed by its neighbour based on the characteristics related to the behaviours of a router running in the Internet in real-time, i.e. the network entity works as anticipated (reliability), is well-protected against attacks by various cryptography techniques and/or Intrusion detection/prevention systems (security), takes actions on protecting the interest of other participants in the network (safety). These attributes may include, as in the present embodiments, but are not limited to:

$O_c$: Cryptography techniques (plain text password, MD5, hash function, digital signature, etc.) is fundamental for protecting routing infrastructure. In theory, the more advanced cryptography techniques the router utilises, the more trust it deserves.

$O_a$: Authentication, authorisation and physical security. The router B may degrade its trust of its neighbour A if A frequently sends routing data which fails to be authenticated or authorised. Also, B degrades its trust in routers with lower physical security. Physical security considers both protection against people (e.g. secure location, door, locks, personnel, backups) as well as protection against natural phenomena/disasters such as fire, overheating or over humidity/dirt/dust, or whether the electricity supply is backed up with an Uninterruptible Power Supply (UPS) or not.

$O_o$: OS and patch version. Out of date Operation System or patch version is an obvious vulnerability, the router without up-to-date version of OS and patch is more vulnerable to attackers (e.g. hackers utilising recently discovered "open doors" closed by a newer version of OS or a recent patch) and does not deserve the full trust of other routers.

$O_p$: Policy management and implementation such as access control, network management, administration and operations, business continuity and disaster recovery, etc. If a router is considered by its neighbours not to honour some agreed, or standard security-related policies, the trust of this router may be downgraded.

$O_v$: Routing message verification: if a router B detects anomaly by verifying (or rather by failing to verify) the routing information from its neighbour A using a method such as that described in copending UK patent application No. GB 0416272.3 filed on 20 Jul. 2004 by the present applicant, with the same inventor, entitled "Method of Operating a Network", A's trust in B may be deteriorated.

$O_u$: Router utilisation (too much or too little traffic), where the router attracts too much traffic or has little traffic, it may signify that the router is functioning abnormally and therefore, for security reasons, it is better to downgrade the trust in it.

$O_d$: Packet dropping/delivery rate. A compromised or misconfigured router may stop forwarding packets or start just dropping most packets received. If its neighbouring routers identify this situation, they may downgrade the trust rate for that router by reducing this element.

More attributes could be added either initially (in enhanced embodiments), or on an ongoing basis (as in the present embodiment), since the tree may "grow" its branches.

In the present embodiment it is envisaged that the various elements will be updated manually by an administrator. In order to protect the privacy of the administrators of peer routers, the various pieces of information requested from the administrators of peer routers may be converted into simple numerical values by the router administrator prior to storing the information on the router. As a further level of privacy protection, the full calculation could be carried out off the router in a secure environment and only an amalgamated trust value (see below) be transferred to the router. Compromises between these two solutions may also be used where the more sensitive elements are numerically combined into a single sensitive component which is then stored on the router as a single value while less sensitive (more dynamic) elements may be stored and modified individually on the router.

In the present embodiment, it is envisaged that an administrator will collect information relevant to each of the above described elements from the administrators of the other router devices in the network where possible and will use this information to generate "scores" in respect of each of the elements. In the present embodiment, each score is a value between 0 and 1, with 0 representing complete mistrust, 1 representing complete trust and 0.5 representing complete uncertainty as to the trustworthiness of the respective router device (in respect of that particular element). In the present embodiment, this is done in a fairly informal way at the discretion of the administrator. However, it is envisaged that in future embodiments an open Internationally agreed standard may be drawn up to specify the criteria to be used for deriving a value for the score in respect of each element (the elements and any sub-elements, etc. also being set out in the standard).

In order to do this, in the present embodiment, a large amount of this information needs to be obtained from other administrators. This information need not be recorded and can simply be used by the receiving administrator to generate scores. If a standard is in existence, then as an alternative the other administrator can calculate the scores themselves and simply pass the scores to the receiving administrator, thus requiring no details to be passed on (except, obviously where these can be reverse-engineered from the scores). Naturally, this will require a certain amount of trust between the administrators that there is no attempt at deceit. Of course, RIP and OSPF are normally used within a single AS in which case this would not be an issue.

Furthermore, some of the information will be able to be obtained by simply measuring one or more properties of the router device in question. For example, the level of cryptography employed by a router is advertised freely so that compatible routers may take advantage of the highest possible level of cryptography, thus this can be established automatically by the router itself, etc. Furthermore, in order to have an IP address correctly allocated to a particular router, it should be registered with an Internet Registry and these will maintain information giving the identity of the owning authority from which details such as its nationality, financial history etc. may generally be located from publicly available sources. Where an administrator has difficulty locating such information he may assume the worst and give the router generally lower trust ratings, or alternatively he may not assume the worst and instead leave the element with a neutral score of 0.5 expressing uncertainty, or adopt some strategy between these two extremes, etc. In future embodiments, a software tool may be written to automatically search for such information from publicly available sources accessible over the Internet, etc.

In the present embodiment the trust rate scores of each element are combined in the following way to generate a universal trust rate, $T_{A>B}$:

$$T_{A>B} = \omega_1 \cdot I_t + \omega_2 \cdot O_t \in \{0,1\}$$

where, $I_t$ is A's inherent trust rate for B and $O_t$ is A's observed trust rate for B And, $I_t = \alpha_1 \cdot I_p + \alpha_2 \cdot I_f + \alpha_3 \cdot I_{te} + \alpha_4 \cdot I_h + \alpha_5 \cdot I_o$ $O_t = \beta_1 \cdot O_c + \beta_2 \cdot O_a + \beta_3 \cdot O_o + \beta_4 \cdot O_p + \beta_5 \cdot O_v + \beta_6 \cdot O_u + \beta_7 \cdot O_d$ Where $I_p, I_f, I_{te}, I_h, I_o$ are the A's inherent sub trust rates for B with respect to political, financial, technical, historical and operational properties. And $O_c, O_a, O_o, O_p, O_v, O_u, O_d$ are A's observed sub trust rates for B with respect to the properties listed in observed trust category.

$\omega_1, \omega_2, \alpha_1, \alpha_2, \alpha_3, \alpha_4, \alpha_5$ and $\beta_1, \beta_2, \beta_3, \beta_4, \beta_5, \beta_6, \beta_7$ are all weighting coefficients.

And $\omega_1 + \omega_2 = 1$ for $\omega_1, \omega_2 \in \{0,1\}$ $\alpha_1 + \alpha_2 + \alpha_3 + \alpha_4 + \alpha_5 = 1$ for $\alpha_1, \alpha_2, \alpha_3, \alpha_4, \alpha_5 \in \{0,1\}$ $\beta_1 + \beta_2 + \beta_3 + \beta_4 + \beta_5 + \beta_6 + \beta_7 = 1$ for $\beta_1, \beta_2, \beta_3, \beta_4, \beta_5, \beta_6, \beta_7 \in \{0,1\}$ Initially, without any knowledge about its neighbours, the following default settings are used:

$\omega_1 = \omega_2 = 1/2 = 0.5$ $\alpha_1 = \alpha_2 = \alpha_3 = \alpha_4 = \alpha_5 = 1.0/5 = 0.2$ $\beta_1 = \beta_2 = \beta_3 = \beta_4 = \beta_5 = \beta_6 = \beta_7 = 1.0/7 = 0.142$ $O_c = O_a = O_o = O_p = O_v = O_u = O_d = 0.5$ $I_p, I_f, I_{te}, I_h, I_o$ can be produced based on an open trusted routing standard.

(N.B. Whenever a new sub inherent or observed trust element is added, a corresponding weighting coefficient will be added and the initial coefficient values of all corresponding elements are modified accordingly.)

Also note that the privacy of various routers is well maintained with this arrangement because the only information which will be readily accessible to third parties (e.g. by being embedded in routing protocol messages, etc.) is the universal trust rate which is composed of so many different components that it will be practically impossible to infer any private information about the corresponding router.

Management of Trust Model

The peering routers periodically exchange trust-related information to enhance the trust relationship with each other. Any modification of sub trust rates affects the value of the universal trust rate.

For example, consider hypothetical peer routers A and B. Initially router A uses only plain-text passwords, so router B's sub trust rate for A, $O_c$ is 0.6, when router B learns from A that A adopts MD5 for authentication, B then decides to raise its sub trust rate, $O_c$, for A to 0.9.

In a realistic routing operation, when the utilisation rate of a router is abnormal (too high or too low) or the dropping rate/delivery rate is too high/low, it suggests that either the router is compromised or under attack, or it is congested by too much traffic. In either scenario, the neighbouring router may want to degrade its sub trust rates for $O_u$, and $O_d$, this reflects that this router is not trusted to be reliable for delivering control messages or customer data. Other routers may want to avoid using it in such a case. Therefore, this method provides both security and congestion control functionality.

Note that the trust relationship between two network entities is asymmetric. That is to say, the trust rate of entity A for entity B is not necessarily equal to the trust rate of B for A.

$$T_{A>B} != T_{B>A}$$

With no centralised global authority, the universal trust rate of one entity for its neighbour is generated locally by computing the inherent and observed trust attributes of its neighbour. Also, the trust rate value is locally stored in the router and is only communicated between neighbouring routers when necessary such as for running BGP.

Evolution of the Trust Tree Model

The universal trust rate is calculated based on the "trust tree" model. It is a single, meaningful value on which a router can rely in order to make routing decisions with more confidence. Universal trust rates are dynamically modified according to any changes in inherent information and observed information when a router is running routing protocols in the Internet (or another data network or internetwork).

This evolution stage includes both positive and negative events. In the positive scenario, when a router operates normally and securely, the values of related sub trust rates calculated by its neighbours increase. In the negative scenario, the values of related sub trust rates decrease. The changing values of trust rates reflect the confidence level for each respective router with respect to the exposed vulnerabilities and threats in the Internet.

The following policies are recommended for calculating the value of sub trust rates of routers in the evolution stage:
a) The value of sub inherent trust rate should be updated based on an open standard whenever the inherent status of A's owner company changes.
b) The value of sub observed trust rate should be decreased by 0.5 if a specific fatal occurrence happens, or by 0.1 if medium occurrence happens; or by 0.01 if minor occurrence happens.
c) The value of observed trust rate of router $O_t$ should be increased by 0.1 quarterly, capped at 1.0, if it runs normally and no fatal or medium security-related occurrence happens.
d) If the trust rate of a router is below 0.4, it should be automatically separated from the routing operation with the neighbours, the router administrator may have to fix the security related problems which lead to its low trust rate and reboot it in order to bring it back for Internet routing operations.

Trusted Routing Protocols

There will now be described examples of three different routing protocols embodying three different embodiments of the present invention. The three different protocols are modified versions of RIP, OSPF and BGP respectively.

Normalised Cost:

Each of the below described protocols relies on a new concept, referred to below as "Normalised Cost", $C_T$. Once the trust relationship is set up among most of the routers in a data network or internetwork (or within a portion of the Internet), these routers can employ this novel trusted routing infrastructure to perform routing operations. The router can use the trust rate metric to set up routes through various routers that are physically secure and that conform to a certain set of trusted IP routing operational policies.

The above referred to new concept called normalised cost/distance with trust rate is defined as:

$$C_T = \frac{C}{T} \quad (1)$$

where C is the original cost/distance value for router A to employ to make routing decision in current routing protocols such as hop count, delay, cost, etc, T is the value of trust rate of router A for its neighbouring router B, and $C_T$ denotes the normalised cost/distance value with trust rate for router A to employ to make routing decision in the novel trusted routing protocol.

For positive routing metrics (i.e. where the idea is to maximise the metric rather than minimise it), such as reliability, bandwidth, etc., the normalised metric should be:

$$C_T = T \cdot C \quad (2)$$

where C and $C_T$ here represent a positive metric rather than a negative metric (i.e. a cost).

T-BGP

Figure 2:
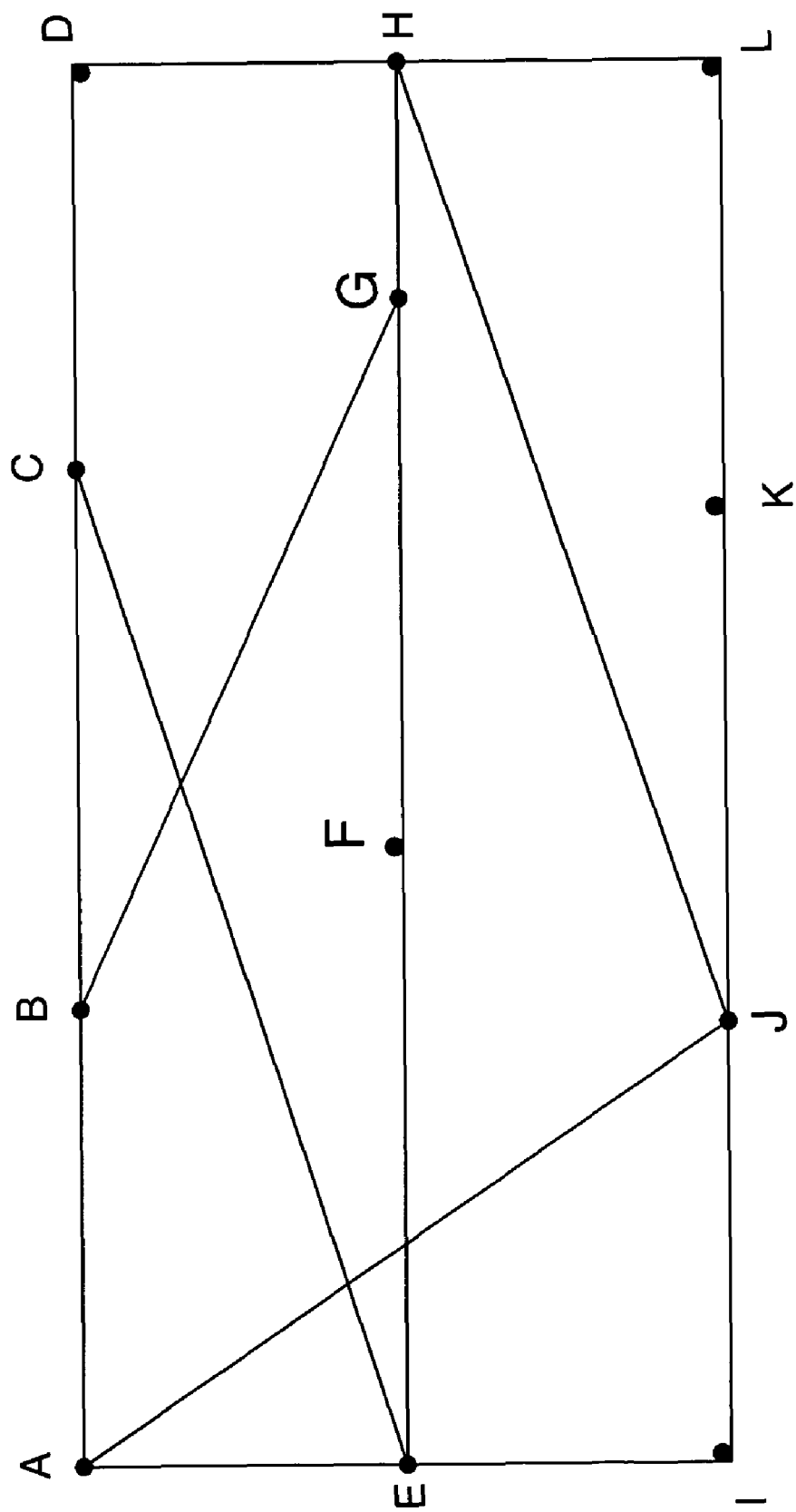
FIG. 2 is a stylised illustration of a network implementing an embodiment of the present invention.

The modified version of BGP is now described with reference to FIG. 2. As mentioned above, in BGP, pairs of BGP routers communicate with each other by establishing TCP connections. Operating this way provides reliable communication and hides all the details of the network being passed through. BGP is fundamentally a distance vector protocol, but it is quite different from RIP. Instead of maintaining just the cost to each destination, each BGP router keeps track of the exact path used. Similarly, instead of periodically giving each neighbour its estimated cost to each possible destination, each BGP router tells its neighbours the exact path it is using.

In the Trusted BGP (T-BGP) of the present embodiment, each router informs all of its neighbours about its connections to the whole network, moreover, it also informs all of its neighbours about the normalised cost (hop count) to the whole network, periodically (e.g. every 300 seconds). In addition, in the present embodiment a router also informs all of its neighbours about its connections (including normalised cost) to the whole of the network whenever the trust rate of any router changes.

To implement this scheme, in the present embodiment, a new type of TRUSTRATE message is used. Currently, two BGP speakers (i.e. peer routers implementing BGP) periodically exchange KEEPALIVE messages to test network connectivity and to verify that both peers are functioning normally. In T-BGP, TRUSTRATE messages operate like KEEPALIVE messages except that they carry trust related information. Naturally, the BGP application running on each BGP speaking router needs corresponding modification (into a T-BGP application) to be able to send, receive and understand such messages.

The modified T-BGP application then employs the normalised cost (with trust rate) in order to compute its routing table. The following numerical example illustrates the T-BGP with reference to FIG. 2.

In original BGP, the routing metric is (traditionally) hop count. The following example illustrates how to compute the path between A and H using T-BGP. A has three neighbouring routers: B, E and J.

At the initialisation stage, routers B, G and H are used as an example.

G knows it is one hop away to its neighbour H, and knows its trust rate value to H, i.e. $T_{G>H}$=0.60, so the normalised cost from G to H becomes:

$$C_{T(G-H)} = C/T_{G>H} = 1/0.6 = 1.67$$

Then G sends to B (as well as to F obviously) the routing path to reach H, G–H and normalised cost, 1.67.

B then calculates its normalised cost (hop count) to H. B knows it is one hop away from G, and knows its trust rate value for G, i.e. $T_{B>G}$=0.80, so the normalised cost from B to G becomes:

$$C_{T(B-G)} = C/T_{B>G} = 1/0.8 = 1.25$$

Then the total normalised cost for path B–G–H is:

$$C_{T(B-G-H)} = C_{T(B-G)} + C_{T(G-H)} = 1.67 + 1.25 = 2.93$$

Now, B advertises to A about the path to H: B–G–H and normalised cost, 2.93.

Assuming $T_{A>B}$=0.90, the normalised cost with trust value for the path A–B–G–H can be computed as:

$$C_{T(A-B-G-H)} = 1/0.9 + 2.93 = 4.04.$$

Assuming $T_{D>H}$=0.71, $T_{C>D}$=0.68, $T_{E>C}$=0.98, the normalised cost for path E–C–D–H is:

$$C_{T(E-C-D-H)} = 1/0.71 + 1/0.68 + 1/0.98 = 1.41 + 1.47 + 1.02 = 3.90.$$

E can then advertise to A about the path to H: E–C–D–H and normalised cost 3.90.

Assuming $T_{A>E}$=0.89, the normalised cost for path A–E–C–D–H is:

$$C_{T(A-E-C-D-H)} = 1/0.89 + 3.90 = 5.02.$$

Similarly, assuming $T_{A>J}$=0.65, $T_{J>H}$=0.86, the normalised cost for path A–J–H is:

$$C_{T(A-J-H)} = 1/0.65 + 1/0.56 = 1.54 + 1.78 = 3.33.$$

Finally, A then decides to choose the path with the shortest normalised cost (hop count) between A and H, which is A–J–H (with a normalised cost of 3.33).

Let us consider another scenario. Now suppose $T_{A>B}$=0.95, $T_{B>G}$=0.92, $T_{G>H}$=0.89, so the normalised cost with trust value for path A–B–G–H can be computed as:

$$C_{T(A-B-G-H)} = 1/0.95 + 1/0.92 + 1/0.89 = 1.05 + 1.08 + 1.12 = 3.25.$$

Therefore, A would decide to choose path A–B–G–H to reach H (with a cost of 3.25) instead of A–J–H (with a cost of 3.33).

Thus it is clear that router A makes its ultimate routing decision by selecting the routing path with the lowest normalised score. As can be seen from this example, this can lead to routes being taken because they are over more trusted routers even though this means travelling via a greater number of routers (e.g. A–B–G–H instead of A–J–H).

Note that in this example, each router only maintains a trust rate for its neighbouring routers. The "normalised score" for non-neighbouring routers is simply taken and used from other routers. This has the advantage of minimising the number of routers about which each router needs to calculate and maintain a trust rating, and therefore leads to a very scalable system. As an alternative however, each router could additionally maintain its own trust ratings for all of its peer routers (including non-neighbouring ones). In such a case, there would be no need to send out any special messages and routers would advertise routes in the normal way (except that a router's selection of it's preferred route to any given destination which it advertises to other routers would be made based on its own "normalised score" using its own maintained trust rates for the routers involved). Each router would then decide on its preferred routes based on the scores calculated for each such entire route using its own trust values for each router involved in the path. This method has the advantage of requiring no special messages which renders the system more easily implementable on a piecemeal basis as routers operating T-BGP can continue to operate perfectly well with routers operating according to normal BGP.

A further variant would be for each router to send the normalised scores as well as each router then further modifying the normalised scores using a trust rating for each peer router (including non-neighbouring ones) maintained on each router, and using these twice normalised scores to determine the ultimate best route.

Naturally, in cases where a router maintains a trust rating for each peer router, a default value may be assigned to peer routers for which no trust information is available. The decision as to the best default value will be taken by the administrator and will depend on the nature of the network, etc. Having a default value of 0.5 is a sensible compromise. Having a default of 0 might be appropriate for certain networks that only wish to have their data routed over routers which are known to be trustworthy (although this will not necessarily guarantee that untrusted routers are avoided). Similarly for some networks that would prefer a higher bandwidth at the risk of occasionally getting their data snarled up in dubious routers, a higher default rate might be applicable, with the possibility of reducing this where routers are found to be untrustworthy.

T-RIP

As mentioned above, in RIP, each router maintains a routing table indexed by, and containing one entry for, each router in the subnet. The entry contains two parts: the preferred outgoing link to use for that destination, and an estimate of the cost to that destination. The metric of cost might be number of hops, time delay in milliseconds, total number of packets queued along the path or something similar.

In this novel Trusted RIP, T-RIP, each router informs all of its neighbours about the connection embedded with trust rate to the whole network. The cost, C, which is used when generating the routing table is replaced by $C_T$, the normalised cost with trust rate using formula (1). The routing algorithm for computing the router's routing table is quite similar to that used in T-BGP. Thus for any destination X, the router adds together the advertised cost from each of its neighbours to X (which will be a normalised cost where those routers are using T-RIP—which will typically be the case since RIP is generally used within a single AS) and the normalised cost to that router, to derive a total normalised cost to X and then the route with the least total cost is selected.

Note that since the routers have no knowledge of the actual route taken to any remote destination beyond the first hop, there is no possibility of introducing an alternative along the lines of the alternative implementation of T-BGP discussed above, and each router will only ever therefore maintain a trust rate value for its neighbouring nodes.

T-OSPF

OSPF is of a class of routing protocols commonly referred to as link state routing protocols. As mentioned above OSPF requires each participating router to have complete topology information of the overall network (which is usually an AS or an area within an AS), i.e., every router has a map that shows all other routers and networks to which they connect (although it might not include every router within the entire AS as OSPF permits areas within an AS to be created in which the internal details (i.e. the internal routers) are hidden from routers outside the area). Different Link state routing protocols may use different routing metrics as the "cost" when calculating a routing table. For example, in OSPF, the inverse of the bandwidth of the link is generally used as the cost of that link.

In T-OSPF, each router announces to the whole network about its normalised cost (embedded with the corresponding trust rate) with all its neighbours. Hence, the cost, C, which is used to calculated routing table is replaced by $C_T$, the normalised cost with trust rate using formula (1). The routing algorithm for computing the routing table is quite similar to that used by T-BGP. Thus, in this embodiment, whenever a link from an originating router to a neighbouring router is advertised by the originating router, it includes the normalised cost of the link rather than the cost before normalisation. Each router then maintains within its internal representation of the network the various normalised costs of each link as calculated by the router responsible for each particular link. Thus each router needs to maintain a trust rate only in respect of its neighbours and not for every router in the network. However, as with T-BGP, variants are possible in which each router does maintain a trust rating for every one of its peers and each router calculates a normalised (or twice normalised) cost for each link based on its own internally maintained trust rating for each respective peer router.

Preferably the behavioural patterns of each node are closely monitored by its neighbours and the trust rating automatically adjusted as appropriate by an autonomous software agent performing the monitoring within each router and any compromised, mis-configured or congested node can automatically be isolated as a result of using only trusted routing paths. Consequently, this encourages good behaviours of routers operating within the Internet, and malfunctioning routers with irregular or bad behaviours or poor security management will be automatically isolated from the Internet routing operations. The Internet routing security will be enhanced massively. Even without using autonomous software agents, a diligent human administrator may speedily isolate untrustworthy routers by closely monitoring the behaviours of neighbour or non-neighbouring peers and adjusting their trust ratings accordingly.

General Points

In general, there are three layers in the trusted IP routing infrastructure. Layer 1 is an Internet trusted model which provides trust related information for layer 2, layer 2 generates a single representative value of trust rate for layer 3, and layer 3 (ie a trusted routing protocol) employs a normalised cost/distance with trust rate to make actual routing decisions.

The major advantages of adopting a method according to the present invention are:

1. This novel framework can incorporate a router's preference based on the trust of its neighbours with existing mandatory routing policies to influence the path selected by a router's traffic. In addition, the trust rate value can help a network administrator to select trustworthy paths when setting routing policies such as in BGP.
2. Where there are multiple shortest paths between any two routers given an IP network topology, the route with highest overall trust rate level will be selected for routing data. The survivability of IP routing infrastructure is improved greatly when attacked, and the performance of IP routing infrastructure is improved greatly when part of network is congested.
3. By embedding a trust model into IP routing infrastructure, trust credential information can be circulated within the Internet easily without consuming too much bandwidth and without having to establish an expensive central trust management system.
4. In that a router locally collects trust information, calculates a trust rate value and makes routing decisions, the scheme is de-centralised and distributed without requiring a central global authority, so it is scalable to large scale Internet system with thousands of routers.
5. This novel architecture can be inter-operable easily with current routing protocols and security technologies and can be gradually deployed. This raises the barriers for attacks.

Variations

In the above described embodiments a simple mathematical weighted summation is used to combine the various components of the trust model to form a global trust value. This is a sensible and effective way of combining the various elements to arrive at a global value guaranteed to lie between 0 and 1. However, other methods could of course be used. For example, some more complex function could be used which has the property that even if only one element (without any restriction on which element this is) approaches a zero trust rating, it will drag the whole trust rating down to a low value, etc.

Similarly a simple mathematical formula has been selected for generating the normalised cost from a "standard" cost (according to formula (1)). However, again more complex functions could be used to generate a normalised cost as a function of the standard cost and the overall trust value without detracting from the present invention. For example a function such as:

$$C_{T(A-B)}=C \cdot (1-T_{A>B}) \text{ or } C_{T(A-B)}=C \cdot e^{1/T_{A>B}}, \text{ etc.}$$

could be used instead to alter subtly the affect of the "normalisation" without detracting greatly from the spirit of the invention.

What is claimed is:

1. A method of operating a data network, of the type in which a number of interconnected router devices forward received packets of data towards a destination node in accordance with a routing table associated with each router, the method comprising:
    assigning a trust value to one or more other router devices, or one or more links between router devices, in the network;
    calculating a route metric in respect of one or more paths for forwarding on received data packets for onward transmission towards a specified destination; and
    selecting a next hop destination for onward transmission of each such received packet to be forwarded on the basis of the calculated route metric for each applicable path,
    wherein each route metric is calculated in dependence upon the trust value assigned to one or more of the router or routers or link or links within each such path, and
    wherein the trust value is based on a number of factors including a plurality of observed trust factors and a plurality of inherent trust factors, the inherent trust factors including a factor based on the entity responsible for the respective router or the router terminating the respective link.

2. A method as claimed in claim 1 wherein the packets of data are transmitted over the network using the Internet Protocol.

3. A method as claimed in claim 1 wherein some of the factors vary with time and more slowly than other of the factors.

4. A method as claimed in claim 1 wherein each router generates a trust value based on said number of factors only in respect of neighboring router devices and communicates this information to non-neighboring routers.

5. A method as claimed in claim 1 wherein each router assigns a trust value to every other peer router device in the network.

6. A method according to claim 5 wherein the trust values assigned by each router to every other router device are not communicated to any other router devices in the network.

7. A method of operating a router device, within a data network of the type in which a number of inter-connected router devices forward received packets of data towards a destination node in accordance with a routing table associated with each router device, the method comprising:
    assigning a trust value to one or more other router devices in the network or to one or more links between router devices within the network;
    calculating a route metric in respect of one or more paths for forwarding on received data packets for onward transmission towards a specified destination; and
    selecting a next hop destination for onward transmission of each such received packet to be forwarded on the basis of the calculated route metric for each applicable route,
    wherein each route metric is calculated in dependence upon the trust value assigned to one or more of the router or routers or link or links within each such path, and
    wherein the trust value is based on a number of factors including a plurality of observed trust factors and a plurality of inherent trust factors, the inherent trust factors including a factor based on the entity responsible for the respective router or the router terminating the respective link.

8. A router device for use in a data network, the router comprising:
    storage means for storing a routing table;
    a plurality of communication ports for transmitting data packets to and receiving data packets from interconnected nodes when the router is in use as part of an interconnected network or internetwork of nodes or networks; and
    a processor or group of processors for calculating a metric in respect of one or more routes for the onward forwarding of received data packets and for selecting a next hop, in respect of each received data packet for onward forwarding, on the basis of the metric calculated for each route leading towards the desired destination of the data packet;

wherein the storage means additionally stores a trust value assigned to each of one or more other router devices within the network or links between router devices within the network;

wherein the processor or group of processors is additionally operable to take into account the trust value of one or more associated other router devices in calculating the or each metric, and wherein the trust value is based on a number of factors including a plurality of observed trust factors and a plurality of inherent trust factors, the inherent trust factors including a factor based on the entity responsible for the respective router or the router terminating the respective link.

9. A computer-readable storage medium containing a computer program or suite of programs for causing a router device or devices to carry out the method of claim 1 during execution of the program or programs.

* * * * *